(12) United States Patent
Kleickmann et al.

(10) Patent No.: US 9,242,565 B2
(45) Date of Patent: Jan. 26, 2016

(54) METHOD FOR BRAKING OF A MOTOR VEHICLE

(75) Inventors: Bodo Kleickmann, Ingolstadt (DE); Thomas-Willibald Meier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/237,326

(22) PCT Filed: Nov. 15, 2011

(86) PCT No.: PCT/EP2011/005740
§ 371 (c)(1),
(2), (4) Date: Feb. 5, 2014

(87) PCT Pub. No.: WO2013/026459
PCT Pub. Date: Feb. 28, 2013

(65) Prior Publication Data
US 2014/0246281 A1    Sep. 4, 2014

(30) Foreign Application Priority Data

Aug. 25, 2011  (DE) .......................... 10 2011 111 594

(51) Int. Cl.
*B60L 7/18* (2006.01)
*B60L 15/20* (2006.01)
(Continued)

(52) U.S. Cl.
CPC ................. *B60L 7/18* (2013.01); *B60L 3/0061* (2013.01); *B60L 7/006* (2013.01); *B60L 7/10* (2013.01); *B60L 7/12* (2013.01); *B60L 7/14* (2013.01); *B60L 7/26* (2013.01); *B60L 11/005* (2013.01); *B60L 11/1803* (2013.01); *B60L 11/1805* (2013.01); *B60L 15/2009* (2013.01); *B60L 2220/14* (2013.01); *B60L 2240/36* (2013.01); *B60L 2240/423* (2013.01); *B60T 2220/04* (2013.01); *B60T 2270/604* (2013.01);
(Continued)

(58) Field of Classification Search
CPC ... B60W 30/18127; B60W 10/08; B60L 7/10; B60L 7/20
USPC .................................................. 303/151, 152
See application file for complete search history.

(56) References Cited

U.S. PATENT DOCUMENTS

| 5,350,985 A | 9/1994 | Konrad et al. |
| 5,565,760 A | 10/1996 | Ball et al. |

(Continued)

FOREIGN PATENT DOCUMENTS

| DE | 41 39 569 | 6/1993 |
| DE | 44 46 219 | 6/1996 |

(Continued)

OTHER PUBLICATIONS

International Search Report issued by the European Patent Office in International Application PCT/EP2011/005740 on Apr. 20, 2012.

*Primary Examiner* — Vishal Sahni
(74) *Attorney, Agent, or Firm* — Henry M. Feiereisen LLC

(57) ABSTRACT

In a method for braking of a motor vehicle which is driven by a drive torque of at least one electrical machine electrically connected to an electric energy storage device, the at least one electrical machine is operated in a first operating mode as a generator for generating a generator braking torque. In a second operating mode, the at least one electrical machine is supplied with electrical energy from the energy storage device in such a way that a braking torque opposing the drive torque is generated by the at least one electrical machine.

11 Claims, 2 Drawing Sheets

(51) Int. Cl.
    *B60L 3/00*           (2006.01)
    *B60L 7/12*           (2006.01)
    *B60L 7/14*           (2006.01)
    *B60L 7/26*           (2006.01)
    *B60L 11/00*         (2006.01)
    *B60L 11/18*         (2006.01)
    *B60L 7/00*           (2006.01)
    *B60L 7/10*           (2006.01)
    *B60W 30/18*         (2012.01)
    *B60W 10/08*         (2006.01)
    *B60W 10/184*        (2012.01)
    *B60W 20/00*         (2006.01)

(52) U.S. Cl.
    CPC ............. *B60W10/08* (2013.01); *B60W 10/184* (2013.01); *B60W 20/00* (2013.01); *B60W 20/1062* (2013.01); *B60W 30/18109* (2013.01); *B60W 30/18127* (2013.01); *B60W 2510/244* (2013.01); *B60W 2540/12* (2013.01); *B60W 2710/105* (2013.01); *B60Y 2300/89* (2013.01); *Y02T 10/642* (2013.01); *Y02T 10/7005* (2013.01); *Y02T 10/7022* (2013.01); *Y02T 10/7275* (2013.01)

(56) References Cited

U.S. PATENT DOCUMENTS

| | | | | |
|---|---|---|---|---|
| 5,788,597 | A * | 8/1998 | Boll et al. | 477/4 |
| 6,126,251 | A * | 10/2000 | Yoshii et al. | 303/152 |
| 6,353,786 | B1 * | 3/2002 | Yamada et al. | 701/70 |
| 6,739,677 | B2 * | 5/2004 | Tazoe et al. | 303/152 |
| 8,396,618 | B2 * | 3/2013 | Cikanek et al. | 701/22 |
| 2004/0034460 | A1 | 2/2004 | Folkerts et al. | |
| 2005/0103551 | A1 * | 5/2005 | Matsuno | 180/243 |

FOREIGN PATENT DOCUMENTS

| | | |
|---|---|---|
| DE | 44 46 485 | 6/1996 |
| DE | 103 36 743 | 3/2004 |
| DE | 102008023305 | 11/2009 |
| EP | 1 876 082 | 1/2008 |
| EP | 2 314 486 | 4/2011 |
| JP | H07-203602 | 8/1995 |
| JP | H08-50567 | 2/1996 |
| JP | H08-256407 | 10/1996 |
| JP | H11-215610 | 8/1999 |
| JP | 2000-272381 | 10/2000 |
| JP | 2008-022660 | 1/2008 |
| JP | 2008-179263 | 8/2008 |

* cited by examiner

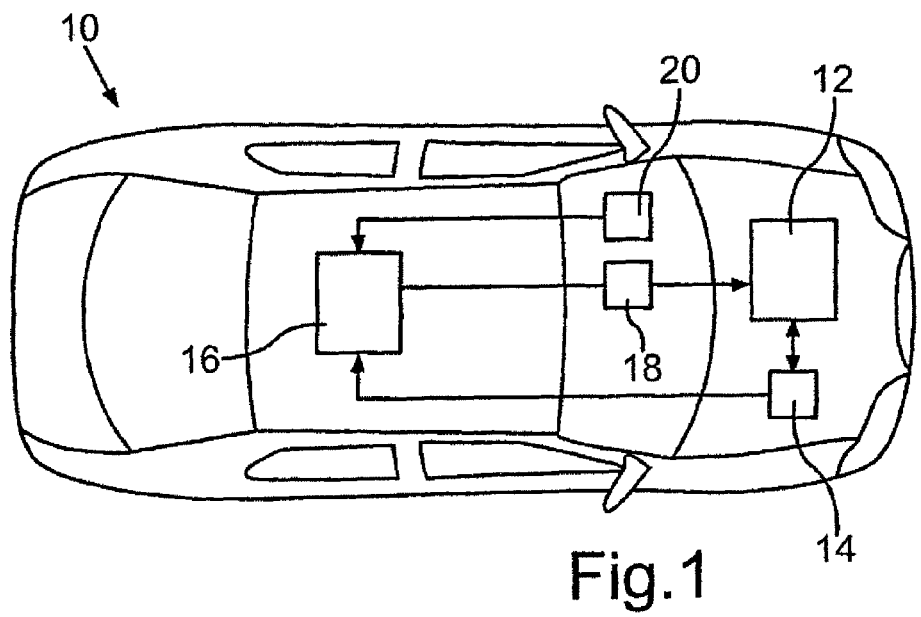
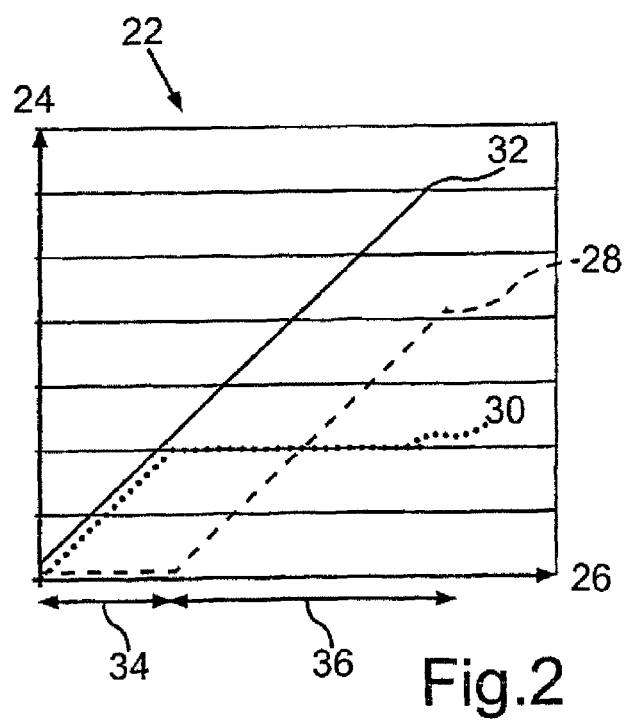
Fig.1
Fig.2

METHOD FOR BRAKING OF A MOTOR VEHICLE

CROSS-REFERENCES TO RELATED APPLICATIONS

This application is the U.S. National Stage of International Application No. PCT/EP2011/005740, filed Nov. 15, 2011, which designated the United States and has been published as International Publication No. WO 2013/026459 and which claims the priority of German Patent Application, Serial No. 10 2011 111 594.7, filed Aug. 25, 2011, pursuant to 35 U.S.C. 119(a)-(d).

BACKGROUND OF THE INVENTION

The present invention relates to a method for braking of a motor vehicle, which is driven by a drive torque from at least one electrical machine. The present invention also relates to a motor vehicle.

Electric or hybrid vehicles, which are driven by at least one electrical machine, place new demands on the braking system of the motor vehicles. In these motor vehicles, the electrical machine can be operated as a generator for braking of the motor vehicle. With this so-called regenerative braking, a portion of the kinetic energy of the motor vehicle can be recovered as electrical energy in a braking operation.

Since the braking torques of the electrical machines are usually insufficient to allow full braking of the motor vehicle, friction brakes are also installed, with which the required braking torque can be generated. However, it is advantageous for energy efficiency to convert with the electrical machine as much of the kinetic energy of the motor vehicle as possible into electrical energy and to dissipate the smallest possible portion as heat with the friction brakes.

When the driver operates the brake pedal of the friction brake, he must initially overcome with the pedal a free travel where the friction brake does not generate a braking force. To recover the greatest possible amount of the kinetic energy with the electric motor or the electrical machine, recuperation must take place already in the free travel of the brake pedal. However, no energy can be fed back into the battery from the electrical machine operating in generator mode when the battery or another energy storage device of the motor vehicle is fully charged. Hence no braking effect can be produced by the electrical machine, changing the braking force acting on the vehicle. This change in braking performance may surprise and unsettle the driver.

To limit this effect on the braking performance, the braking torque of the electrical machine is limited in electric or hybrid vehicles having a conventional brake system. However, the potential of the recuperation cannot be fully exploited as a result. Furthermore, so-called blending-enabled braking systems are used, which activate the friction brake regardless of the operation of the brake pedal by the driver so as to provide most uniform braking behavior. However, these braking systems are expensive. Moreover, solution approaches are used wherein with a fully charged battery the energy of the electrical machine is dissipated as heat via an additional ohmic resistor. However, this approach disadvantageously requires additional space, and additional costs are incurred due to the installation of the additional resistor.

DE 103 36743 A1 describes a system which includes a control unit for a drive train for a coordinated torque control of a motor vehicle, in particular of an electric vehicle or a hybrid vehicle. The torque provided by the individual torque sources is hereby controlled, or a reduction of the torque, for example by flywheels or by counter-current brakes. Here, the operating parameters of the electrical machine or the state of charge of the battery are also monitored. Furthermore, the pedal feedback and the gear shift of the vehicle can be adjusted depending on the driving situation and the driving style of the driver.

SUMMARY OF THE INVENTION

It is the object of the present invention to provide a particularly effective method for braking of a motor vehicle that is driven by at least one electrical machine.

This object is attained by a method for braking of a motor vehicle which is driven by a drive torque from at least one electrical machine that is electrically connected to an electrical energy storage device. Accordingly, in a first operating mode, the at least one electrical machine is operated as a generator for generating a generator braking torque, and in a second operating mode, the at least one electrical machine is supplied with electric energy from the energy storage device so that a braking torque opposing the drive torque is generated by the at least one electrical machine. The braking behavior of the electrical machine can thus be very flexibly adapted to the respective operating state of the motor vehicle.

A motor vehicle, in particular an electric vehicle or a hybrid vehicle, may include one or more electric drive motors. The electric motors or electrical machines are used according to the invention not only for driving the motor vehicle, but also for braking of the motor vehicle. For this purpose, the electrical machine can be operated as a generator. In this first operating mode, which is also referred to as regenerative braking or recuperation, an appropriate generator braking torque is generated by the electrical machine, which causes a braking force acting on the motor vehicle. In this first operating mode, the electrical machine generates electrical energy which can be transferred to an energy storage device of the motor vehicle. In addition, in a second operating mode, electrical energy from the energy storage device can be supplied to the electrical machine for braking of the motor vehicle, so that braking torque opposing the drive torque is generated by the electrical machine. Consequently, electric energy is either generated or consumed when braking of the motor vehicle with the electric motor.

Preferably, the operating mode is adjusted in response to a state of charge of the energy storage device. Such energy storage device may be, for example, a battery or an accumulator or a capacitor. When the energy storage device is not sufficiently charged, the electrical machine is operated as a generator. The energy storage device can then be fully charged. When the energy storage device is fully charged, electrical energy is supplied to the electrical machine for braking, discharging the energy storage. The electrical machine usually has a corresponding cooling system, for example water cooling, so it is not thermally stressed by the heat generated during operation. Therefore, no additional electric resistor needs to be installed in the motor vehicle for converting the energy generated by the electric motor into heat. This allows savings in space and additional costs. Furthermore, the electrical machine can be used for braking of the motor vehicle regardless of the state of charge of the energy storage device.

In a further embodiment, a braking force generated by the at least one electrical machine is set depending on a position of a brake pedal of a friction braking system of the motor vehicle. Since the braking torque provided by the electric motor is usually insufficient to produce bring the motor vehicle to a full stop, additional friction brakes are installed in the motor vehicle. The electrical machine is preferably operated so that the braking force produced by the electrical machine generates in conjunction with the braking force of the friction brake a substantially uniformly increasing braking force over the entire pedal travel, so that effects in the braking behavior are imperceptible by the driver.

In a preferred embodiment, the braking force is produced in a first region of a pedal travel of the brake pedal entirely by the at least one electrical machine. This first region of the pedal travel usually corresponds to the free travel of the brake pedal. Here, the braking force is provided solely by the electrical machine. For this purpose, the electrical machine can be operated both in the first and in the second operating mode.

Preferably, the electrical machine produces a braking force in the free travel of the brake pedal from the time the driver operates the brake pedal, with the braking force increasing substantially linearly as a function of the pedal travel. Thus, a braking force can be generated by the electrical machine and the motor vehicle can be braked already during free travel of the brake pedal. Furthermore, —when the electrical machine is operated as a generator—electric energy can be generated particularly effectively in this first region.

Preferably, the braking force is produced in a second region of the pedal travel of the brake pedal by the at least one electrical machine and friction brake. After the free travel of the brake pedal has been overcome, both by the friction brake and the electrical machine produce a braking force. Electrical energy can thus be recuperated by the electrical machine in generator mode following the onset of the braking effect of the friction brake.

In a further embodiment, the braking force generated by the at least one electrical machine is substantially constant in the second region of the pedal travel. After the overcoming of the free travel of the brake pedal, a substantially linearly increasing braking force is generated by the friction brake of the motor vehicle. When, the braking force generated by the electric motor is set at a substantially constant value in this range, a substantially linear profile results from the sum of the braking forces of the friction brake and the electrical machine over the entire pedal travel. Thus, the driver experiences a familiar braking behavior of the vehicle. The driver is thus not unsettled and the safety of vehicle occupants and other road users can be guaranteed.

The above-described operation of the electrical machine and/or of the friction brake as a function of the pedal travel of the friction brake can be effected in the same way as a function of a pedal force exerted on the brake pedal of the friction brake.

In a further embodiment, after a value characterizing the state of charge of the electric energy storage device exceeds a predetermined first threshold value, a transition from the first operating mode to the second operating mode occurs, and/or after a value characterizing the state of charge of the electric energy storage device falls below a predetermined second threshold value, a transition from the second operating mode to the first operating mode occurs, wherein the second threshold value is smaller than the first threshold value. Thus, the electrical machine can always provide a braking force regardless of the state of charge of the energy storage device.

To generate the braking force as a function of the state of charge of the energy storage device, the electrical machine is operated in either the first operating mode or the second operating mode. The change in the state between the two operating modes may have, for example, a hysteresis-like profile. When the energy storage device or the battery of the motor vehicle is sufficiently or fully charged, a transition from the first operating mode to the second operating mode occurs. Conversely, a transition from the second operating mode to the first operating mode occurs when the energy storage device is similarly discharged. This defined change in the state prevents uncontrolled or rapid switching between the two operating modes, which could adversely affect the braking performance of the vehicle.

Likewise, a braking torque can be generated with the at least one electrical machine during overrun operation or, for example, when the vehicle travels downhill. The electrical machine can hereby be operated in the first operating mode or in the second operating mode.

In a further embodiment, a polarity of electrical connections of the at least one electrical machine is switched to generate the braking torque. The polarity of the electrical connections can be reversed when using a DC machine, so that the DC machine is operated in the opposite direction of rotation compared to the direction of rotation during propulsion. For example, two phases of the electrical supply line can be interchanged when the electrical machine is constructed as a three-phase machine. In this way, so-called countercurrent braking can be readily implemented with the electrical machine.

In a further embodiment, when using a three-phase machine as an electrical machine for producing the braking torque, a frequency of a rotating field of the stator of the rotating field machine may be changed. For example, when an asynchronous machine is used as an electrical machine, the frequency of the rotating field of the stator can be adjusted so as to produce the slip between the stator and rotor required for the countercurrent braking. When using synchronous machines, the angular offset between the stator and the rotor of the synchronous machine can be adjusted accordingly by adjusting the frequency of the rotating field.

Lastly, according to the invention, a motor vehicle is provided which is configured to perform the above-described method for braking of a motor vehicle. To operate the electrical machine in the second operating mode, the motor vehicle includes a corresponding device for switching the polarity of the electrical connections of the at least one electrical machine. To this end, the device may include corresponding power components.

The embodiments described in relation to the method of the invention can likewise be applied to the vehicle according to the invention.

BRIEF DESCRIPTION OF THE DRAWING

The present invention will now be explained in more detail with reference to the accompanying drawings, which show in:

FIG. 1 a schematic diagram of a motor vehicle driven by an electrical machine;

FIG. 2 a diagram showing the braking force generated by the electrical machine and the braking force of a friction brake in response to a pedal travel or to a pedal force applied to the brake pedal, and FIG. 3 a schematic diagram for explaining a change of the state between a first and a second operating mode of the electrical machine of the motor vehicle.

DETAILED DESCRIPTION OF PREFERRED EMBODIMENTS

Figure 3:
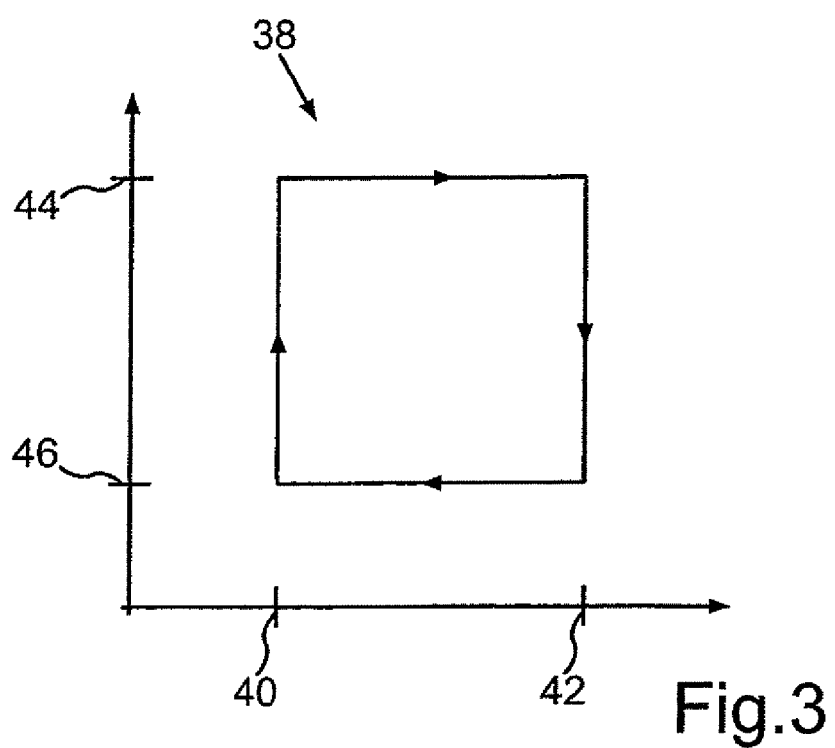

The exemplary embodiments illustrated in greater detail below represent preferred embodiments of the present invention.

FIG. 1 shows a schematic diagram of a motor vehicle 10 in a top view. The motor vehicle 10 is preferably an electric vehicle or a hybrid vehicle. The motor vehicle 10 includes at least one electrical machine 12, which generates a drive torque for driving the motor vehicle 10. Likewise, the automobile 10 may include several electrical machines 12, for example, an electrical machine 12 for each of the drive wheels. Moreover, the vehicle 10 includes an electrical energy storage device 14, which is electrically connected with the electrical machine 12.

The electrical machine 12 can not only be used for driving the vehicle 10, but also for braking of the motor vehicle 10. For braking, the electrical machine 12 can be operated as a generator in a first mode of operation by generating an appropriate braking torque. In this first operating mode, which is also referred to as regenerative braking or recuperation, electric energy is produced by the electrical machine 12 which can be supplied to the electric energy storage device 14.

Likewise, the electrical machine 12 can be operated in a second operating mode for braking of the motor vehicle 10. In this case, electric energy is supplied to the electrical machine 12 from the energy storage device 14, so that the electrical machine 12 generates a braking torque, which opposes the drive torque. The electrical machine 12 may also include a suitable cooling system, such as air or water cooling, in order to prevent thermal overloading of the electrical machine 12.

Preferably, the operating mode is set in response to a state of charge of the electric energy storage device 14. For this purpose, the vehicle 10 includes a suitable controller 16, which can be used to determine the state of charge of the electric energy storage device 14 with an appropriate sensor. When the state of charge of the battery reaches an upper threshold value, the electrical machine 12 can no longer be operated as a generator, since the electrical energy storage device 14 is unable to the absorb generated electric energy. In this case, electrical energy from the energy storage device 14 is supplied to the electrical machine 12 for braking of the motor vehicle 10. For this purpose, the controller 16 is coupled to a device 18 of the motor vehicle 10, which is configured to change the polarity of the terminals of the electrical machine 12. The device 18 may for this purpose include corresponding power components, such as transistors, thyristors or the like, with which the polarities of the electrical machine 12 and the phases of the electrical machine 12 can be interchanged. In this way, a braking torque is generated by the electrical machine 12 in the so called countercurrent operation, which opposes the drive torque of the electrical machine 12.

Similarly, the device 18 may be configured to suitably adjust the rotating field of an electric rotating machine. When using an asynchronous machine as the electrical machine 12, the frequency of the rotating field of the stator can be adjusted by the device 18 so as to produce an appropriate slip between the stator and the rotor of the asynchronous machine. When using a synchronous machine as the electrical machine 12, the corresponding angular offset between the stator and rotor of the synchronous machine can be realized by a suitable adjustment of the frequency of the rotating field of the stator.

The braking force provided by the electrical machine 12 can be adjusted as a function of the position of a brake pedal of a friction brake of a motor vehicle 10. To this end, the motor vehicle 10 includes a respective device 20, which is configured to determine the position of the brake pedal. The device 20 may for this purpose include a corresponding position sensor, distance sensor or the like.

FIG. 2 shows in a diagram 22 the braking force acting on the motor vehicle 10 as a function of the pedal travel of a brake pedal of the friction brake of the motor vehicle 10 and the braking force exerted by the driver on the brake pedal, respectively. The abscissa 26 indicates the pedal travel or the pedal force, whereas the ordinate 24 indicates the braking force acting on the motor vehicle 10. The dotted line 30 shows here the course of the braking force provided by the electrical machine 12 as a function of the pedal travel or the pedal force. The dashed line 28 shows the braking force provided by the friction brake of the motor vehicle 10. The solid line 32 indicates the sum of the braking forces of the electrical machine 12 and the friction brake.

In a first region, indicated by the arrow 34, the braking force is provided exclusively by electrical machine 12. This first region corresponds to the free travel of the brake pedal of the friction brake. In this first region, a braking force is provided by the electrical machine 12, which increases substantially linearly as a function of the pedal travel or the pedal force. The braking force of the electrical machine 12 can be provided in the first operating mode or the second operating mode—depending on the state of charge of the electrical energy storage device 14.

In a second region, indicated by the arrow 36, the braking force acting on the vehicle 10 is provided by the electrical machine 12 and the friction brake of the motor vehicle 10. The electrical machine 12 is here operated so as to produce a braking force that is substantially constant over the pedal travel. In this second region, the friction brake generates a braking force that increases substantially linearly as a function of the pedal travel and the pedal force. This produces a linear profile for the sum of the two braking forces, as shown by line 32, over the entire pedal travel, or over the entire course of the pedal force. Accordingly, the driver does not experience an unusual braking behavior of the motor vehicle 10.

FIG. 3 shows in a diagram 38 the operating mode of the electrical machine 12 as a function of the state of charge of the electric energy storage device 14. The abscissa in the diagram 38 indicates the operating mode of the electrical machine 12, whereas the ordinate indicates the state of charge of the electric energy storage device. The first operating mode is indicated in the diagram 38 by the line 40. In the first operating mode, the electrical machine 12 is operated as a generator. The second operating mode is indicated in the diagram 38 by the line 42. In this operating mode, the electrical machine 12 generates a braking torque opposing the drive torque and is thus operated in countercurrent operation. When the state of charge of the energy storage device 14 exceeds a predetermined first threshold value, which is represented by the line 44, a transition from the first operating mode to the second operating mode occurs. In the second operating mode, the electrical machine 12 draws electric energy from the electric energy storage device 14, thereby discharging the energy storage device 14. When the state of charge of the energy storage device 14 falls below a predetermined second threshold value, which is represented by the line 46, a transition from the second operating mode to the first operating mode occurs. This produces the hysteresis-like profile shown in the diagram 38. Thus, a controlled change of state takes place, which prevents negative effects on the braking performance of the motor vehicle 10.

The invention claimed is:

1. A method for braking of a motor vehicle, which is driven by a drive torque from at least one electric drive motor which is electrically connected to an electrical energy storage device, the method comprising:
   in a first operating mode, operating the at least one electric drive motor as a generator for generating electric energy for supply to the energy storage device, and in a second operating mode, supplying to the at least one electric drive motor the electrical energy from the energy storage device so as to generate a braking torque in opposition to the drive torque.

2. The method of claim 1, wherein the first and second operating mode is set as a function of a state of charge of the energy storage device.

3. The method of claim 1, further comprising adjusting a braking force generated by the at least one electric drive motor as a function of a position of a brake pedal of a friction brake of the motor vehicle.

4. The method of claim 3, wherein the braking force is generated in a first region of a pedal travel of the brake pedal exclusively by the at least one electric drive motor.

5. The method of claim 3, wherein the braking force is generated in a second region of a pedal travel of the brake pedal by the at least one electric drive motor and the friction brake.

6. The method of claim 5, wherein the braking force generated by the at least one electric drive motor is substantially constant in the second region of the pedal travel.

7. The method of claim 1, further comprising transitioning from the first operating mode to the second operating mode when a value characterizing a state of charge of the electric energy storage device exceeds a predetermined first threshold value.

8. The method of claim 7, further comprising transitioning from the second operating mode to the first operating mode when a value characterizing a state of charge of the electric energy storage device falls below a predetermined second threshold value, wherein the second threshold value is smaller than the first threshold value.

9. The method of claim 1, further comprising changing a polarity of electrical connections of the at least one electric drive motor for generating the braking torque.

10. The method of claim 1, wherein the at least one electric drive motor for generating the braking torque comprises a three-phase drive motor, and wherein a frequency of a rotating field of a stator of the three-phase drive motor is changed for generating the braking torque.

11. A motor vehicle comprising:
at least one electric drive motor for generating a drive torque for the motor vehicle,
an electrical energy storage device which is electrically connected to the electrical drive motor,
a controller configured to operate the at least one electric drive motor as a generator for generating in a first operating mode electric enemy for supply to the energy storage device, and
a switching device for changing a polarity of the at least one electric drive motor, so that the electrical energy from the energy storage device is supplied in a second operating mode to the at least one electric drive motor for generating a braking torque in opposition the drive torque.

* * * * *

UNITED STATES PATENT AND TRADEMARK OFFICE
CERTIFICATE OF CORRECTION

| | |
|---|---|
| PATENT NO. | : 9,242,565 B2 |
| APPLICATION NO. | : 14/237326 |
| DATED | : January 26, 2016 |
| INVENTOR(S) | : Bodo Kleickmann and Thomas-Willibald Meier |

It is certified that error appears in the above-identified patent and that said Letters Patent is hereby corrected as shown below:

In the Claims:

In column 7, claim 7, line 1, please correct "further comprising transition ing" to read --further comprising transitioning--.

Signed and Sealed this
Twenty-third Day of August, 2016

Michelle K. Lee
*Director of the United States Patent and Trademark Office*